(12) United States Patent
Takei

(10) Patent No.: US 6,824,373 B2
(45) Date of Patent: Nov. 30, 2004

(54) FOAMING DIE FOR FORMING AN ARMREST

(75) Inventor: Yoshiyuki Takei, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 204 days.

(21) Appl. No.: 10/290,280

(22) Filed: Nov. 8, 2002

(65) Prior Publication Data
US 2004/0091560 A1 May 13, 2004

(51) Int. Cl.[7] ............................................. B29C 45/14
(52) U.S. Cl. ..................... 425/116; 249/95; 264/263
(58) Field of Search .......................... 425/116; 264/263; 249/95

(56) References Cited

U.S. PATENT DOCUMENTS

| | | | |
|---|---|---|---|
| 3,788,590 A | * | 1/1974 | Hasselbach .................. 249/95 |
| 5,106,160 A | | 4/1992 | Nomura et al. |
| 5,182,032 A | * | 1/1993 | Dickie et al. ............... 425/116 |
| 5,275,779 A | | 1/1994 | Marfilius et al. |
| 5,395,226 A | * | 3/1995 | Sakai et al. .................. 425/116 |
| 5,409,297 A | | 4/1995 | De Filippo |
| 5,611,977 A | | 3/1997 | Takei |
| 5,855,831 A | | 1/1999 | Takei |
| 5,967,612 A | | 10/1999 | Takei |
| 6,073,996 A | | 6/2000 | Hatsuta et al. |

* cited by examiner

Primary Examiner—Tim Heitbrink
(74) Attorney, Agent, or Firm—Browdy and Neimark P.L.L.C.

(57) ABSTRACT

A foaming die for forming an armrest, which includes a pair of core die elements in addition to comprising upper and lower dies in which a trim cover assembly with a frame provided there is to be placed for foaming process. Both of the upper and lower dies have, formed therein, recessed die surfaces including local support regions in which the two core die elements can be temporarily secured together and supported against dislocation. Both two core die elements are so designed that they may respectively be attached on two lateral sides of the trim cover assembly and connected with the frame. Hence, the frame in the trim cover assembly can be positively retained in the upper and lower dies against rotation and dislocation.

3 Claims, 4 Drawing Sheets

FOAMING DIE FOR FORMING AN ARMREST

BACKGROUND OF THE INVENTION

1. Field of the Invention

The present invention relates to a foaming die for forming an armrest for an automotive seat. In particular, the invention is directed to a foaming die for forming a rotatable armrest adapted to be mounted on a lateral side of seat back of the seat in a vertically rotatable manner.

2. Description of Prior Art

There has been known a rotatable armrest of the type adapted to be rotatably mounted on a lateral side of a seat back of a vehicle or automotive seat. In this particular sort of rotatable armrest arrangement in the seat, as disclosed in the Japanese Laid-Open Patent Publication No. 2000-236986 for instance, the seat back has, formed in its lateral side, an outwardly projected shaft and a stopper pin, and the armrest is formed with a bearing hole and an arcuate slit at one side thereof, with such an arrangement that the outwardly projected shaft is rotatably inserted in the bearing hole of the armrest, while the stopper pin is slidably inserted in the arcuate slit of the armrest, thereby allowing the armrest itself to be rotatable about that shaft in vertical direction at the lateral side of seat back. Such vertical rotation is limited within the vertical range defined by the upper and lower edges of the arcuate slit, such that the armrest may be positioned at an upright storage (non-use) point when the stopper pin is brought to contact with the upper edge of arcuate slit and may be positioned at a horizontally extending use point when the stopper pin is brought to contact with lower edge of arcuate slit.

Forming this rotatable type of armrest has been disclosed from the Japanese Laid-Open Patent Publication No. 2000-236986 for example. According thereto, a foaming die assembly designed to form such rotatable-type armrest is provided, which comprises an upper die and a lower die, each having a recessed die surface formed therein. In a process for forming an armrest, at first, an armrest frame is placed within a trim cover assembly having a predetermined shape of armrest body. Both armrest frame and trim cover assembly has holes. Then, a setting shaft member (i.e. "setting jig" stated in the publication) is inserted through the holes of those armrest frame and trim cover assembly. It is noted that the recessed die surface of each of the upper and lower dies includes local recessed regions to receive such setting shaft member. Therefore, the assembled unit of the armrest frame and trim cover assembly equipped with the setting shaft member is placed in the recessed die surfaces of the upper and lower dies, while placing the setting shaft member in the local recessed regions. In this prior art, the setting shaft member serves to set both armrest frame and trim cover assembly at a given position in the upper and lower dies. Next, a liquid foaming material is injected into the dies, and then, the foregoing assembled unit is subjected to foaming therein, thereby creating a foam padding in that assembled unit in an integral manner, so that a resulting armrest unit is produced. After removing the resulting armrest unit from both two dies, the setting shaft member is drawn out therefrom to leave the corresponding hole therein. The seat back, to which such armrest unit is to be mounted, typically has a bearing shaft projected from the lateral wall thereof. By inserting that bearing shaft in the hole of the armrest unit and bolting the free end of the bearing shaft, the armrest unit per se is rotatably attached to a lateral side of seat back.

However, according to the above-described conventional foaming die assembly, the setting shaft member is prevented by only one stopper pin against rotation and dislocation in the local recessed region stated above, and the problem therewith is that the armrest frame can not be precisely set at a given position within the trim cover assembly, resulting in a undesired armrest in which the frame is dislocated from the given position.

SUMMARY OF THE INVENTION

In view of the above-stated drawbacks, it is a purpose of the present invention to provide an improved foaming die for forming an armrest, in which a trim cover assembly is placed, with a frame precisely positioned and retained at a given point in the trim cover assembly against dislocation from the given point.

In order to achieve such purpose, in accordance with the present invention, in combination with an armrest comprising a trim cover assembly and a frame provided in the trim cover assembly, the frame including a connection means and an opening means defined in the connection means, there is provided a foaming die which basically comprises:

- an upper die element having a recessed die surface adapted to accommodate one portion of the trim cover assembly therein, the upper die element including a first local recessed portion in the recessed die surface thereof;
- a lower die element having a recessed die surface adapted to accommodate another portion of the trim cover assembly, the lower die element including a second local recessed portion in the recessed die surface thereof;
- a pair of core die elements, each including:
    - a main body portion adapted for close contact with respective pair of lateral walls of the trim cover assembly;
    - a projection means projecting from said main body portion, the projection means being adapted to be inserted in said opening means of said connection means; and
    - an arm means extending from said main body portion;
- with such an arrangement that, when the pair of core die elements are contacted with the respective the pair of lateral walls of trim cover assembly, the projection and arm means of one of the pair of core die elements are respectively contacted with the projection and arm means of another of the pair of core die elements;
- the pair of core die elements being so formed as to be fitted in and between the first and second local recessed portions respectively of the upper and lower die elements; and
- the upper and lower die elements being able to be mated together to accommodate a whole of the trim cover assembly and core die elements therein.

Other various advantages and structural features of the present invention will become apparent from reading of the descriptions hereinafter, with reference to the drawings.

DETAILED DESCRIPTION OF PREFERRED EMBODIMENT OF THE INVENTION

Referring to FIGS. 1 to 8, there is illustrated an exemplary preferred mode of foaming die assembly in accordance with the present invention. In the figures, designation (D) represents a foaming die assembly which comprises a lower die (1), an upper die (2) and a pair of first and second core die elements (3) (4).

Figure 2:
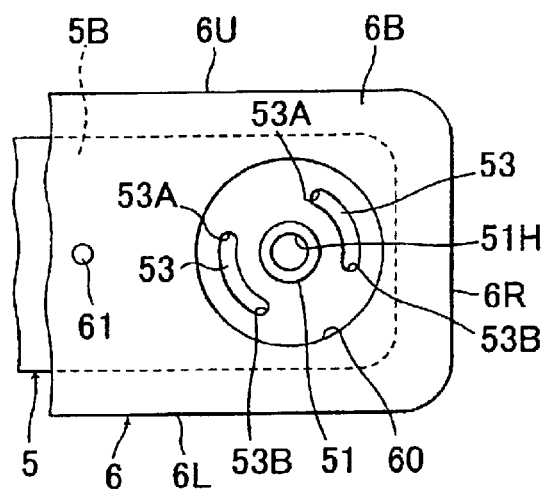
FIG. 2 is a partly broken fragmentary side view of the trim cover assembly and an armrest frame provide therein, which is viewed from one lateral side of those two elements.
Figure 3:
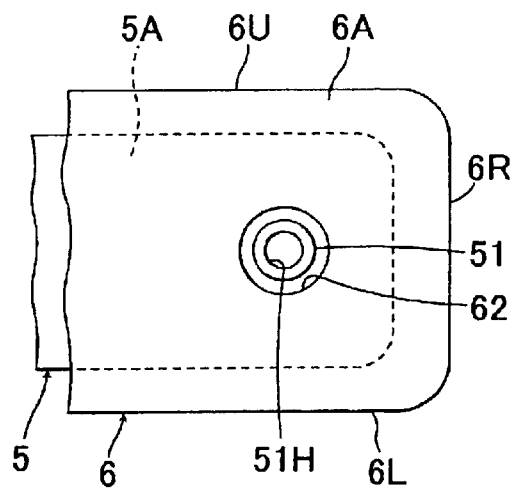
FIG. 3 is a partly broken fragmentary side view of the trim cover assembly and armrest frame provided therein, which is viewed from another lateral side of those two elements.

Also, designation (6) denotes a preformed three-dimensional armrest trim cover assembly in which an armrest frame (5) is provided. The illustrated armrest trim cover assembly (6) is conventional one having an upper wall (6U), a lower wall (6L), a forward end wall (6F), a backward end wall (6R), a first lateral wall (6A) and a second lateral wall (6B). Further, as shown in FIGS. 2 and 3, the trim cover assembly (6) has, formed in the base end portion thereof, a large-diameter hole (60) and a small-diameter hole (62), such that the former hole (60) is defined in the second lateral wall (6B) of the trim cover assembly (6), whereas the latter hole (62) is defined in the first lateral wall (6A) of the same (6). Designation (61) denotes a hole through which an injection nozzle is to be inserted, as will be described later. The armrest frame (5) is also of a conventional type provided with a cylindrical bearing shaft (51) having a through-bore (51H) and formed with a pair of arcuate guide slits (53) (53) at the base end portion (50) thereof. As understandable from FIGS. 1, 2, 3 and 5, one end portion of the cylindrical bearing shaft (51) projects outwardly from one planar side wall of the frame (5), but another end of the shaft (51) is flush with another planar side wall of the frame (5).

The lower and upper dies (1) (2) are so formed to have a first recessed working die surface (10) and a second recessed working die surface (20), respectively.

Figure 1:
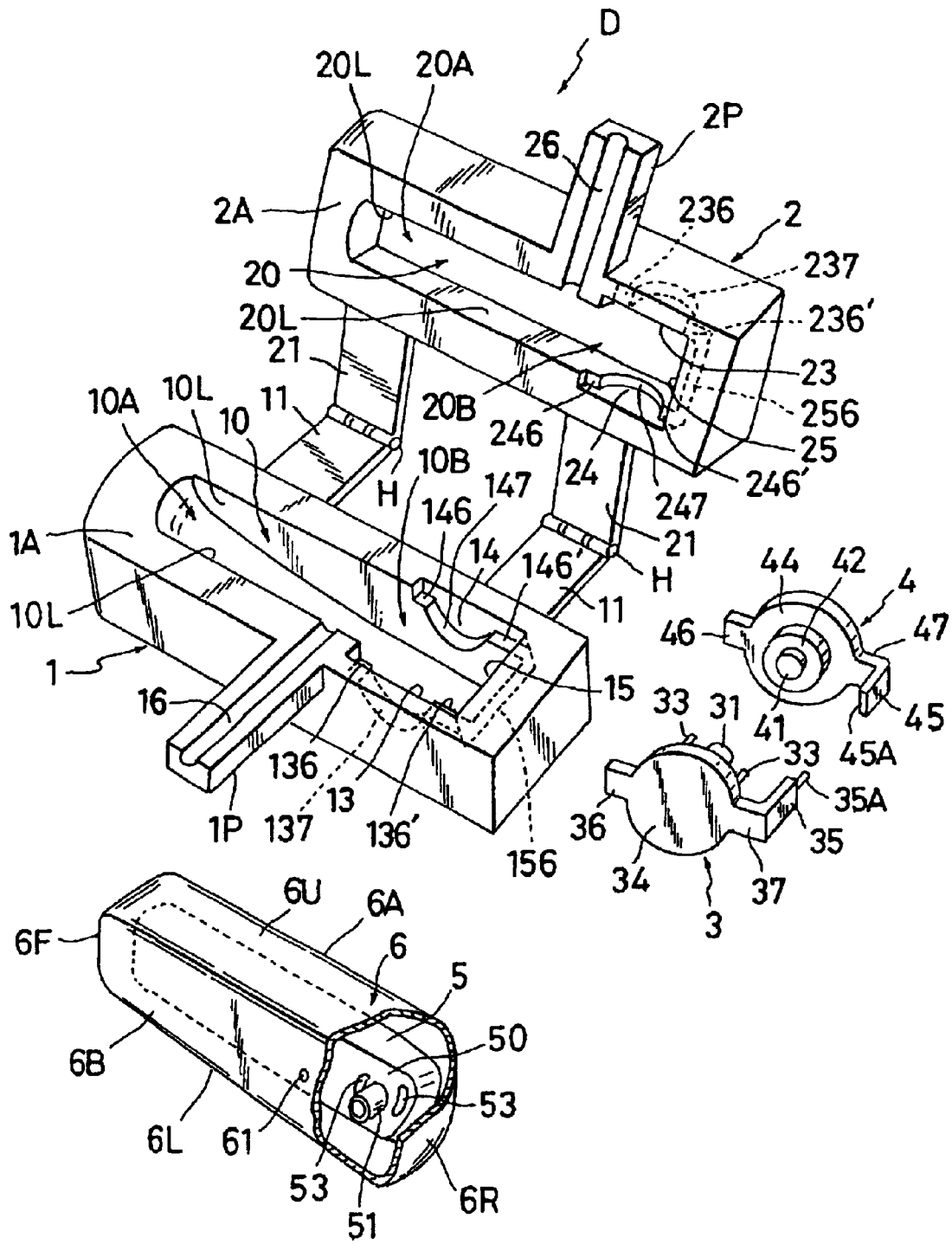
FIG. 1 is a partly broken, explosive perspective view of a foaming die assembly of the present invention and a trim cover assembly.

As shown in FIG. 1, in the lower die (1), there are defined a flat peripheral surface area (1A) and a recessed working die surface area (10) formed in a configuration substantially equal to the contour of the armrest trim cover assembly (6). The first recessed working die surface area (10) basically includes: a first recessed die region (10A) so formed to receive the forward portion of the trim cover assembly (6); a second recessed die region (10B) so formed to receive the backward portion of the trim cover assembly (6); and a pair of mutually facing vertical lateral side surfaces (10L) (10L). Formed respectively in those two vertical lateral side surfaces (10L) at that second recessed die region (10B) are a pair of first and second support recessed portions (13) (14) adapted to supportively engage a lower half of the first core die element (3) and a lower half of the second core die element (4), respectively. The first support recessed portion (13) is formed to have a semi-circular recessed region (137) and a pair of horizontally extending first and second support surfaces (136) (136'). Likewise, the second support recessed portion (14) is formed to have a downwardly recessed semi-circular support surface (147) and a pair of horizontally extending first and second support surfaces (146) (146'). In any case, the two support surfaces (136 and 136') or (146 and 146') are disposed on the opposite sides of the semi-circular support surface (137) or (147), in such as way as to extend horizontally therefrom in a direction opposite to each other.

Further formed in the second recessed die region (10B) is a third support recessed portion (15) in which is defined a horizontally extending third support surface (156) adapted to cover and supportively engage both first and second core die elements (3) (4) as will be described later.

The lower die (1) is also formed with a first nozzle insertion half portion (1P) extending outwardly thereof, wherein a rectilinearly extending half insertion bore (15) is formed in and along the nozzle insertion half portion (1P).

On the other hand, the upper die (2) is of the same structure with the above-described lower die (1). In brief, the lower die (2) has a flat peripheral surface area (2A) and a recessed working die surface area (20) formed in a configuration substantially equal to the contour of the armrest trim cover assembly (6). The recessed working die surface area (20) includes: a first recessed die region (20A); a second recessed die region (20B); and a pair of mutually facing vertical lateral side surfaces (20L) (20L). Formed respectively in those two vertical lateral side surfaces (20L) at that second recessed die region (20B) are a pair of first and second support recessed portions (23) (24) which are adapted to supportively cover and engage an upper half of the first core die element (3) and an upper half of the second core die element (4), respectively. The first support recessed portion (23) is so formed to have a semi-circular recessed region (237) and a pair of horizontally extending first recessed die regions (236) (236'). Likewise, the second support recessed portion (24) is formed to have a downwardly recessed semi-circular support surface (247) and a pair of horizontally extending first and second support surfaces (246) (246'). In any case, the two support surfaces (236 and 236') or (246 and 246') are disposed on the opposite sides of the semi-circular recessed region (237 or 247) in such a way as to extend horizontally therefrom in a direction opposite to each other. Further formed in the second recessed region (10B) is a third support recessed portion (25) in which is defined a horizontally extending third support surface (256) adapted to supportively contact and cover both first and second core die elements (3) (4) as will be described later. A second nozzle insertion half portion (2P) is also formed in the upper die (2), extending outwardly thereof, wherein a rectilinearly extending half insertion bore (25) is formed in and along the nozzle insertion half portion (2P). Such second nozzle insertion half portion (2P) is equal in size to the aforementioned nozzle insertion half portion (1P) associated with the lower die (1).

As shown in FIG. 1, the lower die (1) has a pair of connecting plates (11) (11) and likewise, the upper die (2) has a pair of connecting plates (21) (21). The connecting plates (11) (12) are rotatably connected together by hinges (H) so as to allow the upper die (2) to be rotated about the hinges (H) in a direction toward and away from the lower die (1).

Figure 4:
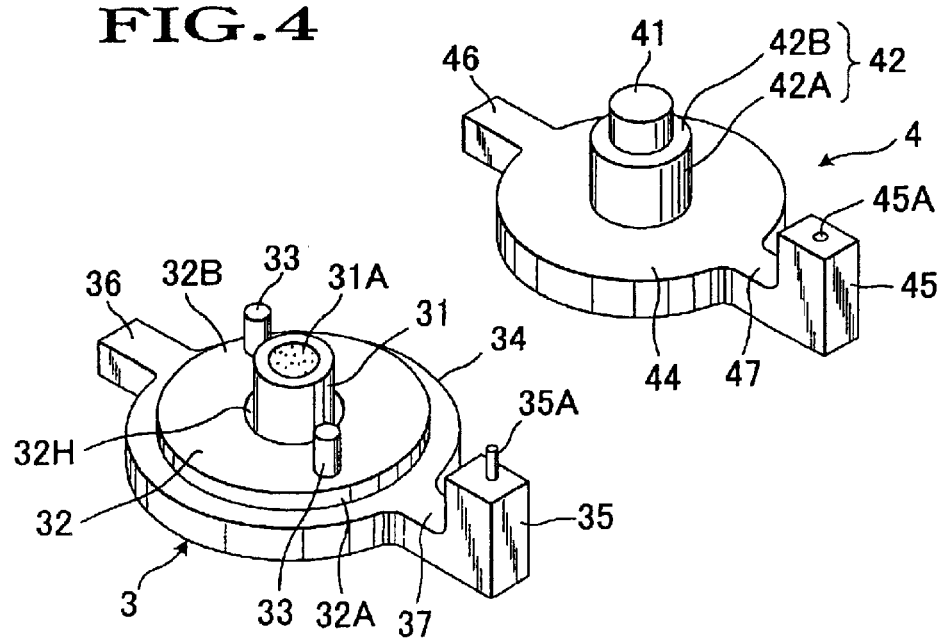
FIG. 4 is a schematic perspective view showing a first core die element and a second core die element to be used in the foaming die assembly.
Figure 5:
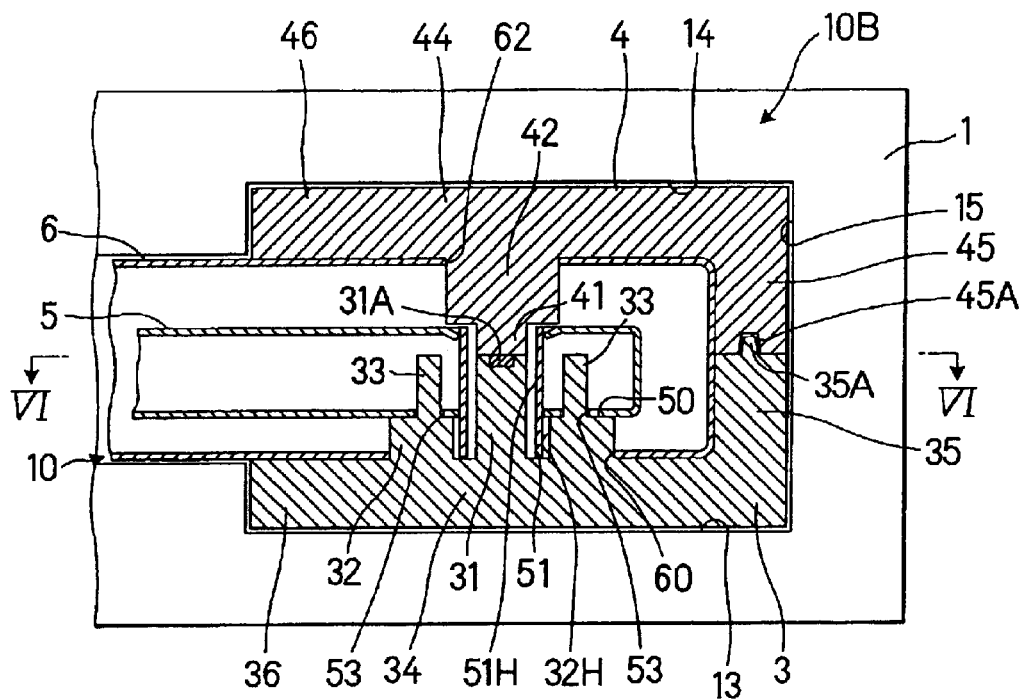
FIG. 5 is a partly broken cross-sectional view of the foaming die assembly under the state where all upper and die elements and the first and second core die elements are engaged and mated together to accommodate the trim cover assembly and armrest frame therein.
Figure 6:
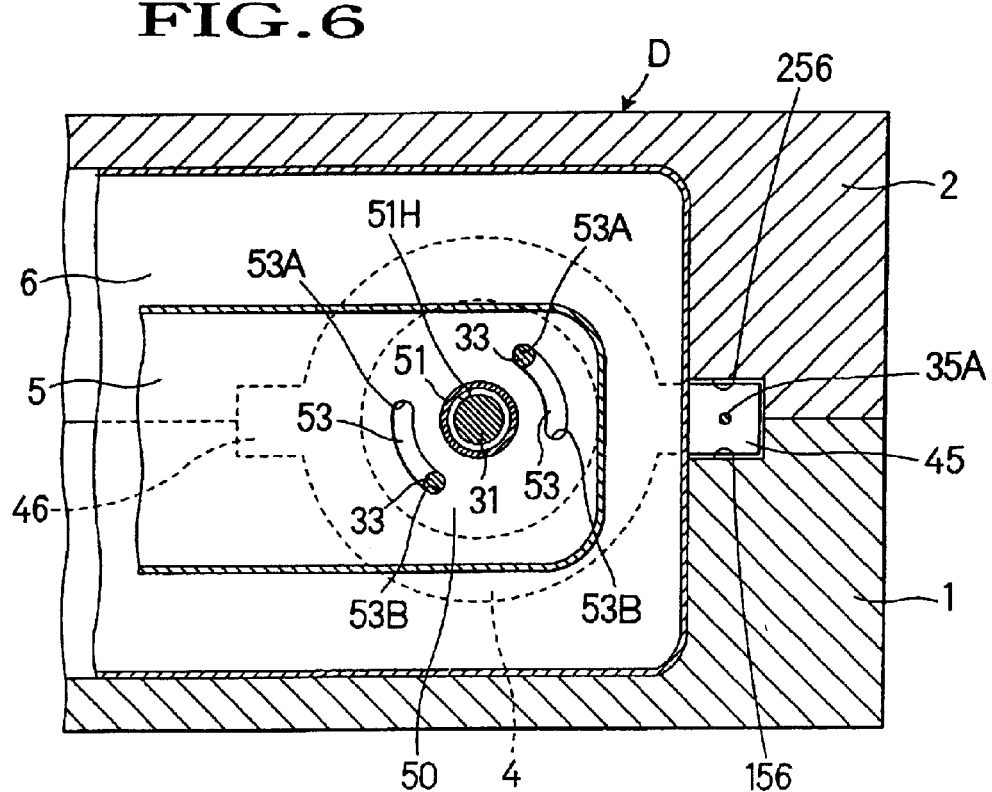
FIG. 6 is a sectional view taken along the line VI—VI in the FIG. 5.

Reference is made to FIG. 4 which depicts the first and second die core elements (3) (4) in details.

The first core die element (3) is formed by: a circular main body portion (34); a first arm portion (36); a second arm portion (37); a raised annular region (32) having a peripheral lateral wall (32A) and also having an outer diameter generally equal to a diameter of the afore-said large-diameter hole (60) of trim cover assembly (6); a pair of stopper pins (33) (33) each being adapted for sliding engagement in the respective two arcuate guide holes (53) (53) of armrest frame (5); and a columnar support portion (31) having an outer diameter generally equal to a diameter of the small-diameter hole (62) of trim cover assembly (6).

The first arm portion (36) extends rectilinearly from one circumferential side of the circular main body portion (34), whereas on the other hand, the second arm portion (37) extends rectilinearly from another opposite circumferential side of the circular main body portion (34), such that the first and second arm portion (36) (37) extends on the same line along the diameter of a circle corresponding to the circular contour of the circular main body portion (34). Namely, it can be stated that a rectilinear line extends through those two arm portions (36) (37) and circular main body portion (34) in the diametrical direction thereof.

The second arm portion (37) is of a generally "L" shape having an angled arm portion (35) extending therefrom by a right angle. A connecting pin (35A) is fixed on the end surface of the angled portion (35).

It is noted that the first and second core die elements are formed from a suitable metallic material that will be magnetically attracted to a magnet.

The columnar support portion (31) is integrally formed in the center of the circular main body portion (34), projecting therefrom in a perpendicular relation therewith. Designation (31A) denotes a magnet piece fixed in the top of that columnar support portion (31). The raised annular region (32), which is smaller in diameter than the circular main body portion (34), is so defined on that particular circular main body portion (34) as to circumscribe the columnar support portion (31), with an annular groove (32H) formed between the raised annular region (32) and columnar support portion (31).

The two stopper pins (33) (33) project from the raised annular region (32) and are disposed in a diametrically opposed relation with each other with respect to the columnar support portion (31). It is noted here that both two stopper pins (33) (33) are disposed at a predetermined angle in relation to the above-noted rectilinear line extending through the first and second arm portions (36) (37) for a purpose of positioning the armrest frame (5) in terms of the pair of arcuate guide slits (53), as will be explained later.

On the other hand, the second core die element (4) is basically identical in size and shape to the above-described first core die element (3). However, the second core die element (4) is devoid of such elements as the raised annular region (32), the two stopper pins (33) and the annular groove (32H). As best shown in FIG. 4, the second core die element (4) is formed by: a circular main body portion (44); a first arm portion (46); a second arm portion (47); a columnar support portion (42) having an outer diameter generally equal to the diameter of the small-diameter hole (62) of trim cover assembly (6); and a columnar connection portion (41) equal in diameter to the columnar support portion (31) of the first core die element (4). The second arm portion (47) has a angel arm portion (45), likewise as in the first core die element (3), the angle arm portion (45) having a connecting hole (45A) formed in the end surface thereof. The columnar connection portion (41) is integrally formed in top end of the columnar support portion (42) and projects therefrom.

Now, description will be made of operation of the above-described foaming die assembly (D).

At first, referring to FIGS. 1 to 6, the first core die element (3) is brought to the large-diameter hole (60) formed in the second lateral wall (6B) of trim cover assembly (6) (6), and then, the columnar support portion (31) of the first core die element (3) is inserted into the through-bore (51H) of the cylindrical bearing shaft (51), while simultaneously, both two stopper pins (33) of the first core die element (3) are slidably inserted in the respective two arcuate guide holes (53) (53) of the armrest frame (5). At this point, the outwardly exposed portion of the cylindrical bearing shaft (51), which extends outwardly from the lateral wall of the armrest frame (5), is inserted in the annular groove (32H) of first core die element (3). It is noted here that the large-diameter hole (60) of trim cover assembly (6) is in a close contact about the peripheral lateral wall (32A) of raised annular region (32).

Thereafter, the second core die element (4) is brought to the small-diameter hole (62) formed in the first lateral wall (6A) of trim cover assembly (6), and then, both columnar connection portion (41) and columnar support portion (42) are passed through such small-diameter hole (62) so that the columnar connection portion (41) is inserted into the through-bore (51H) of cylindrical bearing shaft (51), while simultaneously a care is taken to insert the connecting pin (35A) of first core die element (3) in the connecting hole (45A) of second core die element (4). As can be seen from FIG. 5, the end of the columnar connection portion (41) is magnetically attached to the end of the columnar support portion (31) under the magnetic force of the magnet piece (31A)

It is therefore appreciated that both first and second core die elements (3) (4) are temporarily retained on both trim cover assembly (6) and armrest frame (5) against removal therefrom due to the foregoing magnetic effect, and further, those two core die elements (3) (4) are assuredly prevented against rotation about their respective central axes (at 31 and 41) due to the engagement of the connecting pin (35A) in the connecting hole (45A).

Then, a whole of the trim cover assembly (6) and the first and second core die elements (3) (4) are placed in the recessed die surface (10) of the lower die (1), such that the first and second core die elements (3) (4) are placed in the first and second support recessed portions (13) (14), respectively. Needless to mention, at this stage, the lower halves of those trim cover assembly (6) and core die elements (3, 4) are respectively set in the recessed die surface (10) and support recessed portions (13, 14) which are associated with the lower die (1). Under such state, more specifically, as understandable from FIGS. 5 and 6 in conjunction with FIG. 1, with regard to the first core die element (3), the lower half of its first arm portion (36) and the lower half of its circular main body portion (34) are placed upon the horizontally extending first support surface (136) and the semi-circular recessed region (137), respectively. Also, with regard to the second core die element (4), the lower half of its first arm portion (46) and the lower half of its circular main body portion (44) are placed upon the horizontally extending first support surface (146) and the semi-circular recessed region (147), respectively. Further, the lower halves of the two angled arm portions (35) and (45), which in the aggregate assume a generally "U" shape, are placed on the horizontally extending second support surfaces (136', 146') and third support surface (156) which communicate continuously with one another, assuming a generally "U" shape of horizontally extending support surface. Thus, both first and second core die elements (3) (4) are stably set at a given position in the second recessed region (10B) of lower die (1).

Next, the upper die (2) is rotated downwardly about the hinges (H) to the lower die (1) and mated therewith, so that the first and second recessed die regions (20A) (20B) are engaged closely over the upper halves of trim cover assembly (6) and two core die elements (3) (4), respectively. In this respect, as understandable from FIGS. 5 and 6 in conjunction with FIG. 1, with regard to the first core die element (3), the upper half of its first arm portion (36) and the upper half of its circular main body portion (34) are respectively covered and engaged with the horizontally extending first support surface (236) and the semi-circular support surface (237), respectively. Also, with regard to the second core die element (4), the upper half of its fist arm portion (46) and the upper half of its circular main body portion (44) are covered and engaged with the horizontally extending first support surface (246) and the semi-circular support surface (247), respectively. Further, the upper halves of the two angled arm portions (35) and (45), which in the aggregate assume a generally "U" shape, are covered and engaged with the horizontally extending second support surfaces (236', 246') and third support surface (256) which communicate continuously with one another, assuming a generally "U" shape of horizontally extending support surface. Of course, with this operation, the second nozzle insertion half portion (2P) is mated and aligned with the first nozzle insertion half portion (1P).

Accordingly, it is appreciated that both two die core elements (3) (4) are fitted and retained in the support recessed regions (13, 14, 23, 24) against rotation and dislocation, so that the armrest frame (5) is positively retained at a given position within the trim cover assembly (6); that is, the armrest frame (5) extends horizontally along the central axis of the trim cover assembly (6) without any dislocation. This is due to the fact that the two stopper pins (33) are disposed on the top surface (32B) of raised annular region (32) by a predetermined angle with respect to the rectilinear line extending through the two support arm portions (36) (37), wherein the predetermined angle is importantly such that, as viewed from FIG. 6, one of the two stopper pins (33) will be contacted with an upper extremity (53A) of one of the two arcuate guide slits (53), while another of the two stopper pins (33) will be contacted with a lower extremity (53B) of another of the two arcuate guide slits (53). Therefore, as in FIG. 6, the two stopper pins (33) are respectively in contact with the upper extremity (53A) of one arcuate guide slit (53) and the lower extremity (53B) of another aureate guide slit (53), which effectively insures that the armrest frame (5) itself is prevented against rotation about the two columnar support portions (31) (41) and retained at a fixed point where the frame (5) extends horizontally along the central axis of the trim cover assembly (6).

Figure 7:
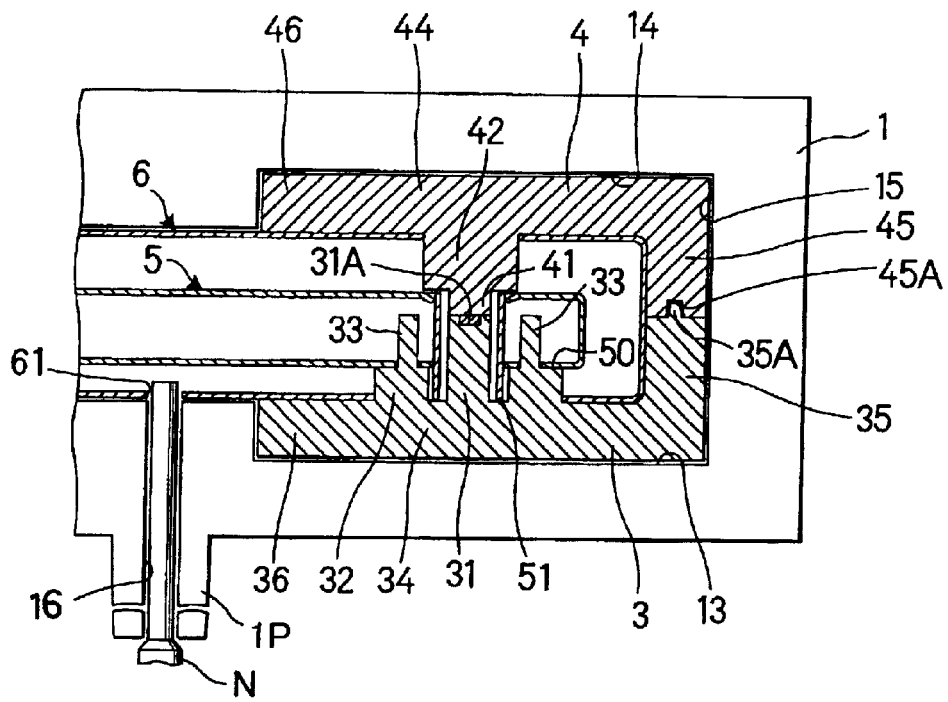
FIG. 7 is a partly broken cross-sectional view similar to that of the FIG. 6, except that the a nozzle insertion portion is shown in the FIG. 7, showing the state where an injection nozzle is inserted through the foaming die assembly into the inside of the trim cover assembly.
Figure 8:
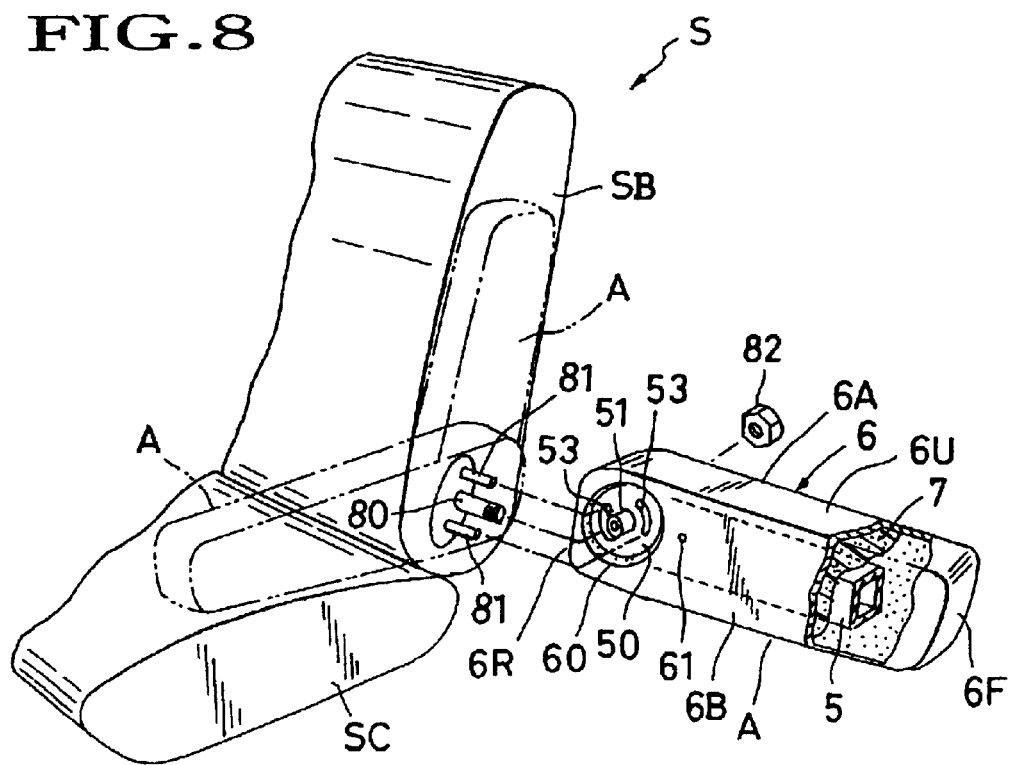
FIG. 8 is a partly broken perspective view of a vehicle seat showing how to secure the resulting armrest to a lateral side of a seat back of the vehicle seat.

Next, as understandable from FIG. 7, an injection nozzle (N) is inserted into the through-bore (51) of the mated first and second nozzle insertion portions (1P) (2P) as well as into the hole (61) of the trim cover assembly (6). While not shown, a suitable liquid foaming material is injected via the nozzle (N) into the inside of the trim cove assembly (6), and a foaming is effected to cure the liquid foaming material to fill a foam padding (7) (see FIG. 8) in the trim cover assembly integrally together with the armrest frame (5), whereupon a rotatable type of armrest (A) is produced and taken from the dies (1) (2), as shown in FIG. 8. During the foaming process, the liquid foaming material is completely prevented from being leaked from the large-diameter hole (60) and small-diameter (62). This is because (i) the circular edge of the large-diameter hole (60) is in a close contact with the circular lateral wall (32A) of raised annular portion (32) of the first core die element (3), while the circular main body portion (34) is also in an intimate contact upon the circular local area of trim cover assembly (6) surrounding the large-diameter hole (60), and (ii) likewise, the circular edge of the small-diameter hole (62) is in a close contact with the circular lateral wall (42A) of columnar support portion (42) of second die element (4), while the circular main body portion (44) of the second die element (4) is also in an intimate contact upon the circular local area of the trim cover assembly (6) surrounding the small-diameter hole (62). Moreover, the liquid foaming material is prevented from being invaded into the through-hole (51A) of cylindrical bearing shaft (51) because the circular shoulder part (42B) of columnar support portion (42) of the second core die element (4) is in a close contact with the circular local area of the armrest frame (5) surrounding one end of the cylindrical bearing shaft (51), while on the other hand, the outwardly projecting end portion of the cylindrical bearing shaft (51) is fitted in the circular groove (32H) of the first core die element (3).

With particular reference to FIG. 8, a vehicle seat (S) is shown, which comprises a seat back (SB) and a seat cushion (SC). Since the vehicle seat (S) is so designed that this particular rotatable sort of armrest (A) may be mounted thereon, a bearing shaft (80) and a pair of stopper pins (81) (81) are fixed at the lower end portion of the lateral side of the seat back (SB) as illustrated. Thus, as understandable from the FIG. 8, the mounting of the resulting armrest (A) to the seat back (SB) is such that the bearing shaft (80) of seat back (SB) is inserted through the through-hole (51H) of cylindrical bearing shaft (51) while inserting the two stopper pins (81) in the respective two arcuate guide slits (53) of the armrest (A), and finally, a nut (82) is threadedly engaged about the threaded end portion of the bearing shaft (80). Accordingly, as indicated by the two-dot chain line in FIG. 8, the armrest is rotatably secured at the lateral side of the seat back (SB).

It should be understood that the present invention is not limited to the illustrated embodiment, but any other modification, replacement and addition may be applied thereto without departing from the scopes of the appended claims.

What is claimed is:

1. A foaming die for forming an armrest for use with a seat, said armrest comprising a trim cover assembly and a frame provided in said trim cover assembly, wherein said trim cover assembly has a pair of lateral walls, and said frame has a connection means for allowing the frame to be rotatably connected to the seat, said connection means including an opening means defined therethrough, said foaming die for forming said armrest, comprising:

an upper die element having a recessed die surface adapted to accommodate one portion of said trim cover assembly therein, said upper die element including a first local recessed portion in the recessed die surface thereof;

a lower die element having a recessed die surface adapted to accommodate another portion of said trim cover assembly, said lower die element including a second local recessed portion in the recessed die surface thereof;

a pair of core die elements, each including:
   a main body portion adapted for close contact with the respective said pair of lateral walls of said trim cover assembly;
   a projection means projecting from said main body portion, said projection means being adapted to be inserted in said opening means of the connection means; and
   an arm means extending from said main body portion;

whereby when said pair of core die elements are contacted with the respective said pair of lateral walls of said trim cover assembly, said projection and arm means of one of said pair of core die elements are respectively contacted with said projection and arm means of another of said pair of core die elements;

said pair of core die elements being so formed as to be fitted in and between said first and second local recessed portions respectively of said upper and lower die elements; and said upper and lower die elements being able to be mated together to accommodate a whole of said trim cover assembly and said pair of core die elements therein.

2. The foaming die as claimed in claim 1, wherein said projection means of said one of said pair of core die elements is provided with a magnet, and wherein said arm means of said one of said pair of core die elements is formed with a protrudent portion, while said arm means of said another of said pair of core die elements is formed with a hole, so that, when said pair of core die elements are contacted with the respective said pair of lateral walls of said trim cover assembly, said projection means of said one of said pair of core die elements is temporarily secured to said projection means of said another of said pair of core die elements under magnetic force of said magnet, while at the same time, said protrudent portion is inserted in said hole.

3. The foaming die according to claim 2, wherein said arm means comprises: a first arm portion projecting from one side of each of said pair of core die elements; and a second arm portion of generally L shape extending from another side of each of said pair of core die elements, wherein said projection means comprises a columnar support portion projecting from a center of said each of said pair of core die elements, wherein said magnet is provided in an end of said columnar support portion associated with said one of said pair of core die elements, wherein said protrudent portion is formed in an end of said second arm portion associated with said one of said pair of core die elements, whereas said hole is formed in an end of said second arm portion associated with said another of said pair of core die elements, and wherein said first local recessed portion of said upper die is so formed to cover and closely contact an upper half of said pair of core die elements as well as upper halves of said first and second arm portions, whereas said second local recess portion of said lower die is so formed to cover and closely contact lower half of said core die elements and lower halves of said first and second arm portions.

* * * * *